United States Patent Office 2,800,978
Patented July 30, 1957

2,800,978
ACETYLENE SOLUTION

Walter B. Howard, Texas City, Tex., assignor to Monsanto Chemical Company, St. Louis, Mo., a corporation of Delaware No Drawing. Application May 13, 1953,
Serial No. 354,887

12 Claims. (Cl. 183—115)

This invention relates to acetylene and more specifically to acetylene solutions. This invention also relates to the recovery of acetylene from an acetylene-containing gas by means of a selective solvent.

It is known in the art that various organic compounds have shown utility as selective solvents for acetylene, thereby affording means for storing acetylene in the form of solutions of acetylene in the solvents and means of extracting acetylene from gas mixtures or increasing the acetylene content of such gas mixtures.

It is an object of this invention to provide a class of solvents having exceptional utility in the aforementioned applications. Other objects will become apparent from the description of this invention.

It has now been discovered that derivatives of phosphonic acid having the formula

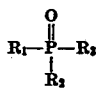

wherein $R_1$ is an alkyl group containing from 1 to 3 carbon atoms, $R_2$ is an alkoxy or dialkylamido group in which the alkyl group contains 1 to 3 carbon atoms, and $R_3$ is a dialkylamido group in which the alkyl group contains from 1 to 3 carbon atoms are excellent solvents for acetylene.

The Bunsen coefficients (volume of gas, measured at 0° C. and 760 mm. Hg, dissolved, at the temperature of the experiment, in one volume of solvent at a gas partial pressure of 760 mm. Hg) for acetylene in these solvents indicate their excellent solvent action for acetylene. The Bunsen coefficients ($\alpha_0$) were determined in the following manner:

A quantity of acetylene was introduced into a calibrated flask and its initial pressure $p_i$ (measured to ±0.05 mm. Hg), initial volume $V_i$ (measured to ±0.05 ml.), and initial temperature $T_i$ (measured to ±0.02° C.) determined. A quantity of solvent was then added to a second calibrated flask and its volume $ml_s$ and vapor pressure $P_s$ determined. The acetylene was then transferred to the flask containing the solvent and, after agitation, the temperature of the liquid was brought to a temperature of 25°±0.005° C. and the temperature of the gas was brought to a temperature of 25.3°±0.05° C. The pressure $p_f$ of the gas, volume $V_f$ of the gas and temperature $T_f$ of the gas were then determined. $\alpha_0$ was then calculated as follows:

$$\alpha = \frac{273.2}{760 ml_s}\left(\frac{p_iV_i}{T_iZ_i} - \frac{(p_f-p_s)V_f}{T_f-Z_f}\right)$$

where $$Z_i = \frac{80,000 - p_i}{80,000}$$

$$Z_f = \frac{80,000 - (p_f - p_s)}{p_f - p_s}$$

$$p_s = x_s P_s$$

$$x_s = \frac{22,400 d_s}{22,400 d_s + \alpha_0 MW_s}$$

where $d_s$=density of solvent at 25° C.
$MW_s$=molecular weight of solvent $$\alpha_0 = \frac{\alpha 760 Z_f}{p_f - p_s}$$

In accordance with the procedure outlined above, the Bunsen coefficients for acetylene at 25° C. in bis(dimethylamido)methanephosphonate and in isopropyl dimethylamido methanephosphonate were found to be 61.27 and 34.91 respectively. A comparison of these values with the value of 13.6 found for γ-butyrolactone, a well-known acetylene solvent, demonstrates their remarkably high solvent power for acetylene. Correspondingly high Bunsen coefficients for acetylene are to be found for the following phosphonates:

Bis(diethylamido)methanephosphonate
Bis(dimethylamido)ethanephosphonate
Methyl dimethylamido methanephosphonate
Ethyl dimethylamido ethanephosphonate
Isopropyl diethylamido methanephosphonate
Bis(dimethylamido)propanephosphonate
Bis(methylethylamido)methanephosphonate
Bis(methylethylamido)ethanephosphonate According to this invention, these solvents are most efficiently used in the extraction of acetylene from diluted acetylene such as is obtained by the partial oxidation of low molecular weight hydrocarbons. As an example, dilute acetylene obtained from the partial oxidation of methane with oxygen has the following composition:

| | Percent |
|---|---|
| $C_2H_2$ | 8.5 |
| $H_2$ | 51.4 |
| $N$ | 1.6 |
| $CO$ | 26.3 |
| $CH_4$ | 5.8 |
| $CO_2$ | 5.9 |
| $C_2H_4$ | 0.1 |
| Heavier acetylenes | 0.4 |

This gas stream is treated under pressure with the aforementioned solvents in any convenient manner well known to those skilled in the art as, for example, by countercurrent absorption in a suitable solvent. The solution of acetylene is then transferred to a suitable desorption column where the pressure is released and the temperature raised. Concentrated acetylene is thus obtained and any contamination of the acetylene with the solvent is so small as to be insignificant.

In addition to the utility of these solvents in the extraction of acetylene from diluted acetylene, the Bunsen coefficients of these solvents clearly indicate that they are particularly suited for storing acetylene under elevated pressures.

The solvents described herein may be used per se, or they may be used in mixtures with other acetylene solvents.

The term "consisting essentially of" which appears in the claims hereof is intended to refer to a composition in which the total amounts of the components set forth in the claim constitutes the predominant proportion in the composition. Such term is not intended to exclude the presence of materials such as moisture or water, or other material which may be present as an inert diluent and does not adversely affect the solution in any manner. However, the term is intended to exclude the presence of materials which so change the character of the composition that it can no longer be regarded as a solution of acetylene.

What is claimed is:
1. A composition of matter consisting essentially of a solution of acetylene in a derivative of phosphonic acid having the formula

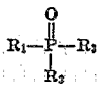

wherein $R_1$ represents an alkyl radical having from 1 to 3 carbon atoms, $R_2$ represents a radical chosen from the group consisting of alkoxy and dialkylamido radicals in which the alkyl group contains from 1–3 carbon atoms, and $R_3$ represents a dialkylamido radical in which the alkyl group contains from 1 to 3 carbon atoms.

2. A composition of matter consisting essentially of a solution of acetylene in bis(dimethylamido)methanephosphonate.

3. A composition of matter consisting essentially of a solution of acetylene in isopropyl dimethylamido methanephosphonate.

4. A composition of matter consisting essentially of a solution of acetylene in bis(dimethylamido)ethanephosphonate.

5. A composition of matter consisting essentially of a solution of acetylene in bis(diethylamido)methanephosphonate.

6. A composition of matter consisting essentially of a solution of acetylene in ethyl dimethylamido ethanephosphonate.

7. In a process for the recovery of acetylene from acetylene-containing gas, the step of contacting said gas with a derivative of phosphonic acid having the formula

wherein $R_1$ represents an alkyl radical having from 1 to 3 carbon atoms, $R_2$ represents a radical from the group consisting of alkoxy and dialkylamido radicals in which the alkyl group contains from 1 to 3 carbon atoms, and $R_3$ represents a dialkylamido radical in which the alkyl group contains from 1 to 3 carbon atoms.

8. In a process for the recovery of acetylene from acetylene-containing gas, the step of contacting said gas with bis(dimethylamido)methanephosphonate.

9. In a process for the recovery of acetylene from acetylene-containing gas, the step of contacting said gas with isopropyl dimethylamido methanephosphonate.

10. In a process for the recovery of acetylene from acetylene-containing gas, the step of contacting said gas with bis(dimethylamido)ethanephosphonate.

11. In a process for the recovery of acetylene from acetylene-containing gas, the step of contacting said gas with bis(diethylamido)methanephosphonate.

12. In a process for the recovery of acetylene from acetylene-containing gas, the step of contacting said gas with ethyl dimethylamido ethanephosphonate.

References Cited in the file of this patent
UNITED STATES PATENTS

| | | |
|---|---|---|
| 2,623,611 | Levine et al. | Dec. 30, 1952 |
| 2,703,154 | Levine et al. | Mar. 1, 1955 |